(12) United States Patent
Cui et al.

(10) Patent No.: US 11,921,415 B2
(45) Date of Patent: Mar. 5, 2024

(54) OPTICAL COATING FOR PROJECTION SCREEN

(71) Applicant: APPOTRONICS CORPORATION LIMITED, Guangdong (CN)

(72) Inventors: Kejian Cui, Guangdong (CN); Fei Hu, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 112 days.

(21) Appl. No.: 17/427,224

(22) PCT Filed: Jan. 18, 2020

(86) PCT No.: PCT/CN2020/072889
§ 371 (c)(1),
(2) Date: Jul. 30, 2021

(87) PCT Pub. No.: WO2020/156262
PCT Pub. Date: Aug. 6, 2020

(65) Prior Publication Data
US 2022/0100073 A1    Mar. 31, 2022

(30) Foreign Application Priority Data
Jan. 30, 2019   (CN) .......................... 201910090312.9

(51) Int. Cl.
*G03B 21/625*   (2014.01)
*C08F 290/06*   (2006.01)
(Continued)

(52) U.S. Cl.
CPC ........ *G03B 21/625* (2013.01); *C08F 290/067* (2013.01); *C09J 175/16* (2013.01); *G03B 21/10* (2013.01); *G03B 21/62* (2013.01)

(58) Field of Classification Search
CPC ... G03B 21/626; C08F 290/067; C09J 175/16
(Continued)

(56) References Cited

U.S. PATENT DOCUMENTS

| | | | | |
|---|---|---|---|---|
| 4,371,459 A | * | 2/1983 | Nazarenko | ........... H01H 13/702 252/514 |
| 7,050,227 B2 | * | 5/2006 | Olofson | ............... G03B 21/625 524/847 |

(Continued)

FOREIGN PATENT DOCUMENTS

| | | |
|---|---|---|
| CN | 1746235 | 3/2006 |
| CN | 1746235 A * | 3/2006 |

(Continued)

OTHER PUBLICATIONS

T.A. Speckhard et al., Properties of UV-Curable Polyurethane Acrylates: Effect of Reactive Diluent, Journal of Applied Polymer Science, vol. 30, 647-666 (1985) (Year: 1985).*

(Continued)

*Primary Examiner* — Stephanie E Bloss
*Assistant Examiner* — Kevin C Butler
(74) *Attorney, Agent, or Firm* — NIXON PEABODY LLP; Jeffrey L. Costellia

(57) ABSTRACT

Provided is an optical coating for a projection screen, containing the following components in parts by weight: 2-15 parts of light-absorbing material, 5-20 parts of aluminum silver powder, 20-60 parts of acrylate oligomer, 10-45 parts of diluent, 0.5-15 parts of photoinitiator, and 0.1-6 parts of auxiliary agent; the light-absorbing material is one or more of carbon black, lamp black, iron black, and aniline black, and has an average particle size of 20-2000 nm; the aluminum silver powder is flake-shaped and has an average particle size of 3-10 μm.

19 Claims, 3 Drawing Sheets

(51) Int. Cl.
*C09J 175/16* (2006.01)
*G03B 21/10* (2006.01)
*G03B 21/62* (2014.01)

(58) Field of Classification Search
USPC .................................................. 359/453
See application file for complete search history.

(56) References Cited

U.S. PATENT DOCUMENTS

| | | | |
|---|---|---|---|
| 7,142,361 B2 | 11/2006 | Olofson et al. | |
| 8,749,076 B2 * | 6/2014 | Okada | C09D 7/61 |
| | | | 156/283 |
| 2005/0128580 A1 * | 6/2005 | Olofson | G02B 1/04 |
| | | | 359/443 |
| 2005/0152032 A1 * | 7/2005 | Olofson | C09J 175/16 |
| | | | 359/453 |
| 2019/0127591 A1 * | 5/2019 | Suryawanshi | C09D 7/61 |
| 2022/0017756 A1 * | 1/2022 | Cui | G03B 21/60 |
| 2022/0017786 A1 * | 1/2022 | Wang | G09F 9/33 |
| 2022/0100073 A1 * | 3/2022 | Cui | C09D 175/16 |

FOREIGN PATENT DOCUMENTS

| | | | | |
|---|---|---|---|---|
| CN | 1894599 | | 1/2007 | |
| CN | 1894599 A | * | 1/2007 | ......... C08F 290/067 |
| CN | 101266399 | | 9/2008 | |
| CN | 101266399 A | * | 9/2008 | |
| CN | 102633984 | | 8/2012 | |
| CN | 102633984 A | * | 8/2012 | |
| CN | 105647311 | | 6/2016 | |
| CN | 105647311 A | * | 6/2016 | |
| CN | 106189628 | | 12/2016 | |
| CN | 106189628 A | * | 12/2016 | ............ B05D 1/02 |
| CN | 107815175 | | 3/2018 | |
| CN | 107815175 A | * | 3/2018 | |
| CN | 108314912 | | 7/2018 | |
| CN | 108314912 A | * | 7/2018 | .......... C09D 163/10 |
| CN | 108912874 | | 11/2018 | |
| CN | 108912874 A | * | 11/2018 | .......... C09D 129/04 |
| CN | 113249027 A | * | 8/2021 | |
| CN | 113717616 A | * | 11/2021 | |
| CN | 112852283 B | * | 4/2022 | .......... C09D 163/10 |
| JP | 2003191249 A | * | 7/2003 | |
| JP | 2006-257368 | | 9/2006 | |
| JP | 4431514 B2 | * | 3/2010 | ......... B29C 45/1679 |
| KR | 2000-0031682 | | 6/2000 | |
| WO | WO-2020156262 A1 | * | 8/2020 | .......... C08F 290/067 |

OTHER PUBLICATIONS

C. Decker et al. Photoinitiated Crosslinking Polymerization, Prog. Polymer Science, vol. 21, 593-650, 1996 (Year: 1996).*
Ann-Sofie Johansson, Ultraviolet (UV) Curable Inks and Coatings, Degree Programme in Environmental Engineering, pp. 1-79, 2015 (Year: 2015).*
C. Decker, 'Photoinitiated Crosslinking Polymerisation', Elsevier Science Ltd, Prog. Polym Sci., vol. 21,593-650, 1996 (Year: 1996).*
Ann-Sofie Johansson, Ultraviolet (UV) Curable Inks and Coatings, Satakunta University of Applied Sciences, Degree Programme in Enviromental Engineering, 2015, 85 pg(s) (Year: 2015).*
Speckard et al., 'Properties of UV-Curable Polyurethane Acrylates:Effect of Reactive Diluent', John Wiley & Sons, Inc., Journal of Applied Polymer Science, vol. 30, 647-666 (1985) (Year: 1985).*
Applicants note that CN-1894599, CN-105647311, CN-102633984, CN-108912874 and CN-106189628, were cited by China Patent Office in a International Search Report dated Apr. 13, 2020 issued in a conterpart International Application No. PCT/CN2020/072889. U.S. Pat. No. 7,142,361, US-2005/128580, U.S. Pat. No. 7,050,227, and US-2005/152032 are in the same family as CN-1894599, and were cited in the foreign communication.
International Search Report for Application No. PCT/CN2020/072889, dated Apr. 13, 2020.
Chinese Office Action in App No. CN201910090312.9, dated Dec. 22, 2021 (18 pp.).
Jin Feng-lin et al., Handbook of Coating Auxiliaries Varieties and Properties, Nov. 30, 1990; 4 pp.
Liu Guo-jie et al., Applied Science and Technology of Coatings; China Light Industry Press, Apr. 30, 1994; 5 pp.
Wang Yi-nong; Study on Synergy Effect of Free Radical-cationic Hybrid Light Curing Composite Resin of Epoxy-acrylate; Polymer Bulletin, No. 7, pp. 111-115, Jul. 31, 2012; China Academic Journal Electronic Publishing House, http://www.cnki.net. DOI:10.14028/J.CNKI.1003-3736.2012.07.011.

* cited by examiner

| 1/2 of the total weight of the acrylate oligomer was mixed with the light-absorbing material uniformly to form a first solution | S11 |

| 1/2 of the total weight of the acrylate oligomer, the aluminum-silver powder, diluent, the photoinitiator, the solubilizer, the wetting dispersant, the anti-settling thixotropic agent, the leveling agent, and the defoamer were added to the first solution, and then mixed well | S12 |

Fig. 1

| 1/3 of the total weight of the epoxy acrylate was mixed with part of the light-absorbing material uniformly to form a second solution | S21 |

| 2/3 of the total weight of the epoxy acrylate, the diluent, the aluminum-silver powder, the photoinitiator, the anti-settling thixotropic agent, the defoamer, the wetting agent, the polymerization inhibitor, and the remaining light-absorbing material were added to the second solution, and then mixed uniformly | S22 |

Fig. 2 the optical coating for projection screen was coated onto a screen substrate — S101 the optical coating for projection screen was cured — S102 a next step was proceeded to after the optical coating for projection screen is completely cured — S103

Fig. 3 the aluminum-silver powder was immersed in 1/2 of the total weight of the diluent to form a third solution — S31 the polyurethane acrylate, the leveling agent and 1/2 of the total weight of the diluent were stirred uniformly at room temperature to form a fourth solution — S32 the light-absorbing material was mixed with the fourth solution to form a fifth solution — S33 the third solution and the fifth solution were mixed and stirred, and the dispersant, the defoamer, the polymerization inhibitor and the photoinitiator were added — S34

Fig. 4 the optical coating for projection screen was applied onto a screen substrate by screen printing  S201 the optical coating of projection screen was cured by blue light irradiation to the surface dry  S202 a surface of the screen substrate without the optical coating for projection screen was laminated with the diffusion film to form a light-resistant screen product  S203

Fig. 5

OPTICAL COATING FOR PROJECTION SCREEN

TECHNICAL FIELD

The present disclosure relates to an optical coating for projection screen, which belongs to the technical field of screen manufacturing.

BACKGROUND

With the continuous development of laser projection technology, laser TVs have received widespread attention and recognition from consumers due to their advantages such as small size, large projection area, and low cost, thus its market has being expanding year by year. Currently, though the luminous flux of laser TVs has achieved a high level, under the influence of ambient light, the projection pictures yet cannot be as clear and bright as the traditional TVs.

In order to increase the contrast of the laser projection pictures and thus produce images with full color and rich tones, laser TVs need a screen having anti-ambient light effects. Currently, there have been on the market a variety of types of screens having anti-light or light-absorbing effects that may be obtained by special optical microstructures or specially prepared optical coatings. As a new product, photocureable coating is an important constituent part in the further development of the coating field due to its advantages of simple construction and low cost.

Photocureable coatings on the market are generally an oil-based systems. Thus a large amount of organic solvents need to be used to dissolve the film-forming substances in the coating. These organic solvents volatilize into the air during the film-forming process of the coating, releasing volatile organic compounds (VOC), which seriously threatens the health of the staff and pollute the environment. In addition, currently there are few product types of photocureable coatings, and their optical effects cannot meet the increasingly demanding projection requirements, which can hardly provide desirable display effects.

SUMMARY

In view of the deficiencies of the prior art, the technical problems to be solved by the present disclosure is to provide an optical coating for projection screen. The film-forming substances in the optical coating for projection screen can be dissolved without volatile organic solvents, and cured using a photocuring process during application, which has no release of any volatile organic compounds, and compared with the traditional solvent-based optical coatings, has advantages of environmental friendliness and being able to greatly reduce gas pollution. Aluminum-silver powder and light-absorbing material are added to the optical coating for projection screen, and the screen attains directional high reflectivity via the directional alignment of the aluminum-silver powder, thereby achieving the effect of high gain, and the addition of the light-absorbing material improves the contrast of the screen, making the image color of the laser TV projection pictures more saturated and vivid.

The technical problem to be solved by the present disclosure is addressed through the following technical solutions:

The present disclosure provides an optical coating for a projection screen, including the following components in parts by weight:

| | |
|---|---|
| a light-absorbing material | 2 to 15 parts by weight; |
| an aluminum-silver powder | 5 to 20 parts by weight; |
| an acrylate oligomer | 20 to 60 parts by weight; |
| a diluent | 10 to 45 parts by weight; |
| a photoinitiator | 0.5 to 15 parts by weight; and |
| an auxiliary agent | 0.1 to 6 parts by weight, | wherein the light-absorbing material is one or more of carbon black, lamp black, iron oxide black, or aniline black and has an average particle size of 20 nm to 2000 nm, and the aluminum-silver powder is flake-shaped and has an average particle size of 3 μm to 10 μm.

In summary, the present disclosure provides an optical coating for projection screen, which simultaneously increase the gain and contrast of the projection screen. The film-forming substances in the optical coating for projection screen can be dissolved without volatile organic solvents, and cured using a photocuring process during application, which has no release of any of volatile organic compounds, and compared with the traditional solvent-based optical coatings, has advantages of environmental friendliness and being able to greatly reduce gas pollution. The aluminum-silver powder and light-absorbing material are added to the optical coating for projection screen, the screen attains directional high reflectivity via the directional alignment of the aluminum-silver powder, thereby achieving the effect of high gain, and the addition of the light-absorbing material improves the contrast of the screen, making the image color of the laser TV projection pictures more saturated and vivid.

The technical solution of the present disclosure will be described in detail below with reference to specific examples.

BRIEF DESCRIPTION OF DRAWINGS

In order to clarify the technical solutions in the embodiments of the present disclosure, the accompanying drawings necessary for describing the embodiments are briefly introduced as follows. It should be understood that the accompanying drawings described below illustrate some embodiments of the present disclosure.

FIG. 1 illustrates a flow chart of a preparation method of the optical coating for projection screen of Example 1 provided by the present disclosure.

FIG. 2 illustrates a flow chart of a preparation method of the optical coating for projection screen of Example 4 provided by the present disclosure.

FIG. 3 illustrates a flow chart of an application method of the optical coating for projection screen of Example 4 provided by the present disclosure.

FIG. 4 illustrates a flow chart of a preparation method of the optical coating for projection screen of Example 7 provided by the present disclosure.

FIG. 5 illustrates a flow chart of an application method of the optical coating for projection screen of Example 7 provided by the present disclosure.

DESCRIPTION OF EMBODIMENTS

The present disclosure provides an optical coating for projection screen, including the following components in parts by weight:

| | |
|---|---|
| a light-absorbing material | 2 to 15 parts by weight; |
| an aluminum-silver powder | 5 to 20 parts by weight; |

| | |
|---|---|
| an acrylate oligomer | 20 to 60 parts by weight; |
| a diluent | 10 to 45 parts by weight; |
| a photoinitiator | 0.5 to 15 parts by weight; and |
| an auxiliary agent | 0.1 to 6 parts by weight; |

The light-absorbing material mainly functions to absorb ambient light to achieve the effects of light resistance and improving contrast. The light-absorbing material may be one or more of carbon black, lamp black, iron oxide black, or aniline black. In some embodiments, the carbon black is acetylene carbon black, and the average particle size of the light-absorbing material is 20 nm to 2000 nm, in some embodiments is 20 nm to 1000 nm, and in some embodiments is 35 nm to 100 nm.

The addition of the light-absorbing material reduces the reflectivity of the entire coating. For diffuse reflection screens, the projection pictures become darker at all angles, which affects the viewing experience. In order to ensure high contrast (anti-ambient light) and high brightness at the same time, the diffuse reflection (Lambertian scattering) phenomenon that occurs when the projection screen reflects the projection light needs to be adjusted to reflect the projection light in a certain angle range (Gaussian scattering). That is, in terms of optical properties, both high contrast and high brightness are satisfied by ensuring the brightness in a narrow viewing angle.

The aluminum-silver powder is used to reflect the projection light, and the viewing angle can be reduced through the accumulation and alignment of small-size powders, so as to improve the screen gain. The aluminum-silver powder is flake shaped, which can be silver dollar shaped, snowflake shaped, or scaly, and in some embodiments is silver dollar shaped. In view of the fact that when a particle size greater than 10 μm of the flake-shaped aluminum-silver powder is unfavorable for its alignment in the resin, the average particle size of the aluminum-silver powder in the present disclosure may be 3 μm to 10 μm, in some embodiments be 3 μm to 5 μm, and in some embodiments be 3 μm. The flake diameter-thickness ratio (the ratio of flake diameter to thickness) of the aluminum-silver powder is 500 to 1000.

Diffuse reflection (i.e., Lambertian scattering) and Gaussian scattering generally occur when the aluminum-silver powder reflects the projection light. Specifically, when the aluminum-silver powder in the coating formed after the curing of the optical coating for projection screen is mostly irregularly arranged, there are more cases of diffuse reflection; when the aluminum-silver powder in the coating is arranged in a certain orientation, the reflected light can be focused within a certain angle as much as possible, thus Gaussian scattering occurs. In other words, in order to achieve the Gaussian scattering of the screen coating, the aluminum-silver powder need to be arranged regularly.

It's noted that adjusting the ratio of the aluminum-silver powder to the light-absorbing material can adjust the final optical effect of the optical coating for projection screen. Specifically, as the ratio of the aluminum-silver powder increases, the gain of the projection screen increases while the contrast somewhat decreases; and as the ratio of the aluminum-silver powder decreases, the gain of the projection screen decreases while the contrast increases. Those skilled in the art can make adjustment according to actual needs.

The acrylate oligomer acts as a film-forming substance in the optical coating for projection screen, and it can polymerize by itself or with other components to form a polymer under the initiation of the photoinitiator. The acrylate oligomer may be one or more of polyurethane acrylate, polyester acrylate, polyether acrylate, or epoxy acrylate. It's noted that, as the oligomer is a mixture, a molecular formula or a structural formula thereof cannot be accurately afforded, the name such as "polyurethane acrylate" is already a feature classification, and no further detailed description has been seen.

In the related art, the photocureable coating contains an organic solvent. The organic solvent refers to a liquid that is used to dissolve film-forming substances (such as acrylic resin) and evaporate during the coating film formation process. A large amount of organic compounds (VOCs) that threaten the environment will be released during the evaporation of the organic solvent. In order to avoid the above problems, the present disclosure uses the acrylate oligomer as the film-forming substance, so that no addition of organic solvent is needed during the film-forming process, and the acrylate oligomer can be dissolved by the addition of only a diluent that evaporates no organic compound, thereby reducing environmental pollution.

The diluent is an acrylate diluent monomer, which can be cross-linked with the acrylate oligomer to form a film-forming substance. Those skilled in the art can make selections depending on the type of the acrylate oligomer, for example, it can be one or more of methyl methacrylate (MMA), poly(ethylene glycol) diacrylate (PEGDA), poly(ethylene glycol) dimethacrylate (PEGDMA), triethylene glycol diacrylate (TEGDA), lauryl acrylate (LA), hexanediol diacrylate (HDDA), trimethylolpropane triacrylate (TMPTA), trimethylolpropane trimethacrylate (TMPTMA), or pentaerythritol triacrylate (PETA). It is noted that when the reaction system is an aqueous system, deionized water can be selected as the diluent. It is noted that the ratio of the acrylate oligomer to the diluent monomer in the present disclosure mainly affects the viscosity of the optical coating for projection screen, which can be adjusted by those skilled in the art according to actual conditions.

The photoinitiator is a type of compounds that are active under ultraviolet light or visible light, and is used to initiate the mutual or self-polymerization of the acrylate oligomer and the diluent. The photoinitiator includes, but is not limited to, one or more of diphenyl phosphine oxide (TPO), 1-hydroxycyclohexyl phenyl ketone (HCPK, Irgacure 184), camphorquinone, tertiary amine, or iodonium salt.

The auxiliary agent includes one or more of a defoamer, a polymerization inhibitor, a wetting agent, or an antioxidant.

The defoamer mainly plays a defoaming effect, and includes, but is not limited to, ethanol, n-butanol, organosilicone ester, and mineral oil. The defoamer accounts for 0.1 to 3 parts by weight, in some embodiments for 0.2 to 1 part by weight.

The polymerization inhibitor mainly plays a polymerization inhibiting effect, and includes, but is not limited to, hydroxyanisole and/or hydroquinone. The polymerization inhibitor accounts for 0.2 to 3 parts by weight.

The wetting agent includes, but is not limited to, lecithin, polyamino salts, polyvalent carboxylates, and the like.

After the traditional solvent-based optical coating is sprayed on the screen, the pressure generated during the solvent evaporation can squeeze the aluminum-silver powder in the film to arrange in a parallel orientation, thereby obtaining a desirable narrow viewing angle. However, another environmentally friendly coating and production method thereof have to be found in view of the pollution problem caused by the solvent-based coating.

In order to facilitate the directional alignment of the aluminum-silver powder in the coating, so as to improve the directional reflectivity of the final product, in some embodiments, the acrylate oligomer is an acrylate oligomer with low acid value and high hydroxyl value, particularly an acid value (mgKOH/g) of 8 or less, and a hydroxyl value (mgKOH/g) of 65 or more.

Furthermore, in order to avoid the release of volatile organic compounds and facilitate the production and applying of the optical coating for projection screen, the acrylate oligomer is an aqueous acrylate oligomer. In this case, correspondingly, the diluent may be deionized water, or deionized water and acrylate diluent monomer; in some embodiments, the defoamer is an aqueous system; in some embodiments, the aluminum-silver powder is an aqueous aluminum-silver powder; and in some embodiments, the light-absorbing material such as carbon black is an aqueous light-absorbing material.

In order to facilitate the dissolution of the aqueous acrylate oligomer in deionized water, 3 to 10 parts by weight of a solubilizer can be further added. The solubilizer may be one or more of ethylene glycol monobutyl ether, diethylene glycol monomethyl ether, propylene glycol methyl ether, or dipropylene glycol butyl ether.

In other embodiments, the optical coating for projection screen of the present disclosure may further include 0.1 to 5 parts by weight of a leveling agent, and the leveling agent is cellulose acetate butyrate. The addition of the leveling agent can level and directionally align the aluminum-silver powder, and can also assist in improving the effect of the directional alignment of the aluminum-silver powder. In some embodiments, in the case that the acrylate oligomer is an aqueous acrylate oligomer, the leveling agent is an aqueous system. In some embodiments, the leveling agent accounts for 1 to 2 parts by weight.

In some other embodiments, the optical coating for projection screen of the present disclosure may further include 0.5 to 5 parts by weight of an anti-settling thixotropic agent, and the anti-settling thixotropic agent is one or more of organic bentonite, polyethylene wax, polyamide wax, or polyurethane thixotropic agent. The addition of the anti-settling thixotropic agent can prevent the aluminum-silver powder from settling and increase the thixotropy of the material system. In some embodiments, the amount of the anti-settling thixotropic agent accounts for 1 to 2 parts by weight.

In some other embodiments, the optical coating for projection screen of the present disclosure may further include 0.2 to 5 parts by weight of a dispersant, and the dispersant is one or more of polyol, stearic acid, or phosphate. The dispersant mainly plays a dispersing effect. In some embodiments, in the case that the acrylate oligomer is an aqueous acrylate oligomer, the dispersant is a wetting dispersant. In some embodiments, considering that the addition of the wetting dispersant need to be beneficial for the directional alignment of the aluminum-silver powder, the wetting dispersant is a low acid value system, such as a wetting dispersant DISPERBYK-192 made in Germany. In some embodiments, the wetting dispersant accounts for 0.5 to 2 parts by weight.

Due to the addition of the light-absorbing material, whether it is an active reaction system or an aqueous reaction system, the light-absorbing material will absorb part of the light during the photocuring process, which may cause problems such as incomplete curing. To solve these problems, the present disclosure can adopt dual light initiation system. Specifically, the optical coating for projection screen may further include epoxy resin oligomer. The epoxy resin oligomer acts as a film-forming substance in the optical coating for projection screen, and it can polymerize by itself or with other components to form a polymer under the initiation of the photoinitiator. For example, it may be one or more of glycidyl ether epoxy resin, glycidyl ester epoxy resin, or glycidyl amine epoxy resin. Similar to the acrylate oligomer, as the oligomer is a mixture, it cannot accurately be afforded a molecular formula or a structural formula, the name such as "glycidyl ether epoxy resin" is already a feature classification, and no further detailed description has been seen.

Coatings with different properties, such as different curing speed, hardness, tensile strength, elongation at break, and the like, can be obtained by using the epoxy resin oligomer and the acrylate oligomer in combination. In addition, the combination of the two with a specific photoinitiator allows the optical coating to adopt a combination of free radical polymerization and cationic polymerization, which can not only quickly cure the optical coating, but also ensure the deep curing of the coating film by dark reaction, thereby avoiding the problem of incomplete curing caused by the addition of the light-absorbing material. In some embodiments, when the optical coating for projection screen includes both the acrylate oligomer and the epoxy resin oligomer, the content of the acrylate oligomer is 20 to 25 parts by weight, and the content of the epoxy resin oligomer is 20 to 25 parts by weight. Furthermore, when the acrylate oligomer is an aqueous acrylate oligomer, in some embodiments, the epoxy resin oligomer is an aqueous epoxy resin oligomer.

The selection of the photoinitiator for the optical coating for projection screen including both the acrylate oligomer and the epoxy resin oligomer will be specifically described below. When the photoinitiator includes camphorquinone and tertiary amine, the camphorquinone is in an excited state after absorbing light, which can generate active center through hydrogen transfer effect with the tertiary amine, thus initiating free radical polymerization. When the photoinitiator includes camphorquinone and iodonium salt, the camphorquinone is in an excited state after absorbing light, which can generate active center through interacting with the iodonium salt, thus initiating cationic polymerization.

Wherein, the tertiary amine includes, but is not limited to, triethylamine, ethyl N,N-dimethylaminobenzoate, or ethyl 4-dimethylaminobenzoate. The iodonium salt includes, but is not limited to, triaryl iodonium salts, diaryl iodonium salts, or alkyl iodonium salts. In some embodiments, in order to ensure sufficient reaction, the molar ratio of the camphorquinone to the tertiary amine is 1:1, and the molar ratio of the camphorquinone to the iodonium salt is 1:1. That is, when the camphorquinone, the tertiary amine and the iodonium salt are used together as the photoinitiator, the molar ratio of the camphorquinone, the tertiary amine and the iodonium salt is 2:1:1.

It is noted that all of the materials of the present disclosure have no special limitation on their sources, and can be purchased on the market or prepared according to conventional methods well known to those skilled in the art.

The components and characteristics of the optical coating for projection screen of the present disclosure will be described in detail below with reference to specific examples.

Example 1

The specific composition and ratio of components of the optical coating for projection screen in this example are:

| | |
|---|---|
| aqueous carbon black (an average particle size, 35 nm) | 3 parts by weight |
| aqueous aluminum-silver powder (an average particle size, 6 μm; a flake diameter-thickness ratio, 1000 or less) | 10 parts by weight |
| aqueous acrylate oligomer (acid value, 3 or less; hydroxyl value, 115 ± 3) | 54 parts by weight |
| deionized water | 22 parts by weight |
| camphorquinone | 4 parts by weight |
| ethylene glycol monobutyl ether | 8 parts by weight |
| DISPERBYK-192 | 1 part by weight |
| polyamide wax | 1 part by weight |
| aqueous cellulose acetate butyrate | 0.5 part by weight |
| ethanol | 0.5 part by weight. |

As shown in FIG. 1, a preparation method of the optical coating for projection screen of this example, is introduced below, and the preparation method includes the following steps:

S11: ½ of the total weight of the acrylate oligomer was mixed with the light-absorbing material uniformly to form a first solution; and S12: ½ of the total weight of the acrylate oligomer, the aluminum-silver powder, diluent, the photoinitiator, the solubilizer, the wetting dispersant, the anti-settling thixotropic agent, the leveling agent, and the defoamer were added to the first solution, and then mixed well.

At block S11, the acrylate oligomer and the light-absorbing material can be uniformly mixed by grinding or high-speed shear stirring during mixing. In some embodiments, the stirring speed is 2000 to 3000 r/min. The purpose of adding the acrylate oligomer in two batches is to mix the acrylate oligomer uniformly.

Since the viscosity of the solution is reduced after the diluent is added, in order to prevent the generation of bubbles, stirring with a medium-low speed should be maintain at block S12, in some embodiments, the stirring speed is 500 r/min or less.

In addition, in order to obtain a uniformly mixed optical coating for projection screen, those skilled in the art can change the actual adding order of the acrylate oligomer, the aluminum-silver powder, the diluent, the photoinitiator, the solubilizer, the wetting dispersant, the anti-settling thixotropic agent, the leveling agent, and the defoamer according to actual conditions, and can also adjust the amounts of the acrylate oligomer added in the two batches.

It is noted that, in order to prevent denaturation of the optical coating for projection screen, the optical coating needs to be stored in sealing condition.

The optical coating for projection screen can be used for surface applying of a variety of screen substrates, such as flat screens, black matrix, grille, Fresnel screens, and the like, which are screens with optical microstructures and have the tested advantages of good alignment of the aluminum-silver powder, good coating film performance, excellent optical effects, convenient construction, environmental friendliness, and so on. The combination of the aluminum-silver powder and the light-absorbing material imparts the projection screen with a light-resistant effect. The projection screen prepared with such optical coating can reflect and absorb light simultaneously, so as to achieve the projection effect of high gain and high contrast. Applying the optical coating for projection screen to the screen substrate with optical microstructures can prepare an optical screen that can resist ambient light interference, which can effectively increase the contrast of the laser TV projection pictures, and make the image color more saturated and vivid. Compared with the traditional solvent-based optical coatings, it generates no organic pollutant during the applying process, which greatly reduces gas pollution, and is an environmentally friendly product.

The optical coating for projection screen was used as a raw material to produce an optical screen with Fresnel microstructures, and the contrast and center gain of the screen were tested. The contrast was 10.5, and the center gain was 1.1.

Example 2

The specific composition and ratio of components of the optical coating for projection screen in this example are listed below:

| | |
|---|---|
| aqueous carbon black (average particle size, 35 nm) | 2 parts by weight |
| aqueous aluminum-silver powder (average particle size, 10 μm; flake diameter-thickness ratio, 1000 or less) | 15 parts by weight |
| aqueous acrylate oligomer (acid value, 5 or less; hydroxyl value, 70 ± 3) | 50 parts by weight |
| deionized water | 21 parts by weight |
| camphorquinone | 3 parts by weight |
| diethylene glycol monomethyl ether | 8 parts by weight |
| DISPERBYK-192 | 2 parts by weight |
| polyethylene wax | 2 parts by weight |
| aqueous cellulose acetate butyrate | 0.5 part by weight |
| n-butanol | 0.5 part by weight. |

The optical coating for projection screen in this example can be prepared by the preparation method described in Example 1, which will not be repeated here.

The components in this example were mixed to prepare the optical coating for projection screen to be used to produce an optical screen with Fresnel microstructures. The effects achieved were that, the contrast was 8.5, and the center gain was 0.95.

Example 3

The specific composition and ratio of components of the optical coating for projection screen in this example are listed below:

| | |
|---|---|
| aqueous carbon black (average particle size, 35 nm) | 4 parts by weight |
| aqueous aluminum-silver powder (average particle size, 3 μm; flake diameter-thickness ratio, 1000 or less) | 5 parts by weight |
| aqueous acrylate oligomer (acid value, 3 or less; hydroxyl value, 110 ± 3) | 60 parts by weight |
| deionized water | 23 parts by weight |
| camphorquinone | 3 parts by weight |
| diethylene glycol monomethyl ether | 5 parts by weight |
| DISPERBYK-192 | 0.5 part by weight |
| polyamide wax | 0.5 part by weight |
| aqueous cellulose acetate butyrate | 1 part by weight |
| n-butanol | 1 part by weight. |

The optical coating for projection screen in this example can be prepared by the preparation method described in Example 1, which will not be repeated here.

The components in this example were mixed to prepare the optical coating for projection screen to be used to produce an optical screen with Fresnel microstructures. The effects achieved were that, the contrast was 9.5, and the center gain was 1.0.

Example 4

The specific composition and ratio of components of the optical coating for projection screen in this example are listed below:

| | |
|---|---|
| carbon black (average particle size, 35 nm) | 5 parts by weight |
| aluminum-silver powder (average particle size, 10 μm; flake diameter-thickness ratio, 1000 or less) | 16 parts by weight |
| epoxy acrylate (acid value, 6 or less; hydroxyl value, 80 or more) | 35 parts by weight |
| trimethylolpropane triacrylate | 35 parts by weight |
| diphenyl phosphine oxide | 4 parts by weight |
| organosilicone ester, lecithin, hydroxyanisole | 2.5 parts by weight |
| polyethylene wax | 2.5 parts by weight. |

As shown in FIG. 2, a preparation method of the optical coating for projection screen of this example is introduced below, and the preparation method includes the following steps:

S21: ⅓ of the total weight of the epoxy acrylate was mixed with part of the light-absorbing material uniformly to form a second solution; and S22: ⅔ of the total weight of the epoxy acrylate, the diluent, the aluminum-silver powder, the photoinitiator, the anti-settling thixotropic agent, the defoamer, the wetting agent, the polymerization inhibitor, and the remaining light-absorbing material were added to the second solution, and then mixed uniformly.

At block S21, a high-speed shear stirring, in some embodiments, stirring at a speed of 2000 to 3000 r/min was adopted during mixing, and then grinding was adopted for uniformly mixing. The purpose of adding the epoxy acrylate in two batches was to mix the epoxy acrylate uniformly.

Since the viscosity of the solution is reduced after addition of the diluent, in order to prevent the generation of bubbles, at block S22, stirring with a medium-low speed should be maintained, and in some embodiments, the stirring speed is 500 r/min or less.

In addition, in order to obtain a uniformly mixed optical coating for projection screen, those skilled in the art can change the actual adding order of the epoxy acrylate, the diluent, the aluminum-silver powder, the photoinitiator, the anti-settling thixotropic agent, the defoamer, the wetting agent, and the light-absorbing material according to actual conditions, and can also adjust the amounts of the epoxy acrylate added in the two batches. Since the amount of the epoxy acrylate added at block S21 in this example is small, if all the light-absorbing material is directly mixed with the small amount of the epoxy acrylate, the viscosity is high and it is difficult to mix uniformly. Therefore, in this example, the light-absorbing material is added in two batches.

As shown in FIG. 3, an application method of the optical coating for projection screen of this example, is introduced below and the preparation method includes the following steps:

S101: the optical coating for projection screen was coated onto a screen substrate;

S102: the optical coating for projection screen was cured; and

S103: a next step was proceeded to after the optical coating for projection screen is completely cured.

At block S101, the coating can adopt any one of spraying, roller coating, blade coating, curtain coating or screen printing. In order to save material while ensuring the flatness of the coating film, in some embodiments, the screen printing is adopted. Since the energy required to cure the optical coating is positively related to the thickness of the optical coating, when the maximum thickness limit is exceeded, the optical coating cannot be fully cured, and the adhesion of the coating on the screen substrate and its own mechanical properties will be affected. Therefore, in some embodiments, the film thickness of the optical coating for projection screen formed on the screen substrate is 200 μm or less, and in some embodiments, 100 μm or less.

At block S102, the curing light source can select a light source with a emitting wavelength in the ultraviolet or visible light band, which can be a thermoluminescent light source (such as incandescent lamp, halogen lamp, etc.), gas discharge light source (such as fluorescent lamp, metal halide lamp, etc.), or solid lighting source (such as LD laser, LED laser light). It is noted that, in order not to affect the directional alignment of the aluminum-silver powder in the coating, the light source needs to be placed on the side of the optical coating for projection screen to directly irradiate and cure the optical coating for projection screen, rather than on the side of the screen substrate.

The components in this example were mixed according to the above steps to prepare the optical coating for projection screen, which was used to produce an optical screen with Fresnel microstructures. The effects achieved were that the contrast was 11.5 and the center gain was 1.05.

Example 5

The specific composition and ratio of components of the optical coating for projection screen in this example are listed below:

| | |
|---|---|
| lamp black (average particle size, 1000 nm or less) | 10 parts by weight |
| aluminum-silver powder (average particle size, 10 μm; flake diameter-thickness ratio, 1000 or less) | 15 parts by weight |
| epoxy acrylate oligomer (acid value, 3 or less; hydroxyl value, 110 or more) | 35 parts by weight |
| hexanediol diacrylate | 30 parts by weight |
| 1-hydroxycyclohexyl phenyl ketone | 3 parts by weight |
| organosilicone ester, lecithin, hydroxyanisole | 2.5 parts by weight |
| polyurethane | 4.5 parts by weight. |

The optical coating for projection screen in this example can be prepared by the preparation method described in Example 4, which will not be repeated here.

The components in this example were mixed to prepare the optical coating for projection screen, which was used to produce an optical screen with Fresnel microstructures. The effects achieved were that the contrast was 12 and the center gain was 0.95.

Example 6

The specific composition and ratio of components of the optical coating for projection screen in this example are listed below:

| | |
|---|---|
| aniline black (average particle size, 1000 nm or less) | 5 parts by weight |
| aluminum-silver powder (average particle size, 10 μm; flake diameter-thickness ratio, 1000 or less) | 20 parts by weight |
| epoxy acrylate oligomer (acid value, 8 or less; hydroxyl value, 120 or more) | 32 parts by weight |

-continued

| | |
|---|---|
| triethylene glycol diacrylate | 36 parts by weight |
| camphorquinone | 2 parts by weight |
| organosilicone ester, lecithin, hydroxyanisole | 2.5 parts by weight |
| polyurethane | 2.5 parts by weight. |

The optical coating for projection screen in this example can be prepared by the preparation method described in Example 4, which will not be repeated here.

The components in this example were mixed to prepare the optical coating for projection screen, which was used to produce an optical screen with Fresnel microstructures. The effects achieved were that the contrast was 10.5 and the center gain was 1.1.

Example 7

The specific composition and ratio of components of the optical coating for projection screen in this example are listed below:

| | |
|---|---|
| carbon black (average particle size, 35 nm) | 3 parts by weight |
| aluminum-silver powder (average particle size, 5 μm; flake diameter-thickness ratio, 1000 or less) | 12 parts by weight |
| polyurethane acrylate (acid value, 6 or less; hydroxyl value, 115 ± 3) | 20 parts by weight |
| glycidyl ether epoxy resin | 20 parts by weight |
| hexanediol diacrylate | 23 parts by weight |
| photoinitiator | 6 parts by weight |
| cellulose acetate butyrate | 3 parts by weight |
| phosphate | 1 part by weight |
| defoamer | 1 part by weight |
| polymerization inhibitor | 1 part by weight. |

As shown in FIG. 4, a preparation method of the optical coating for projection screen of this example, is introduced below and the preparation method includes the following steps:

S31: the aluminum-silver powder was immersed in ½ of the total weight of the diluent to form a third solution;

S32: the polyurethane acrylate, the leveling agent and ½ of the total weight of the diluent were stirred uniformly at room temperature to form a fourth solution;

S33: the light-absorbing material was mixed with the fourth solution to form a fifth solution; and S34: the third solution and the fifth solution were mixed and stirred, and the dispersant, the defoamer, the polymerization inhibitor and the photoinitiator were added.

Wherein, the optical coating for projection screen includes polyurethane acrylate and glycidyl ether epoxy resin, and the photoinitiator includes camphorquinone, tertiary amine and iodonium salt, wherein the molar ratio of the camphorquinone, the tertiary amine and the iodonium salt is 2:1:1.

At block S31, in some embodiments, the immersing time is 4 h to 12 h.

At block S33, in some embodiments, grinding with a grinder is performed until the light-absorbing material is completely dispersed.

At block S34, the mixing and stirring is preferably performed at a low speed (500 r/min or less).

In addition, in order to prevent denaturation of the optical coating for projection screen, the optical coating needs to be stored in sealing condition.

As shown in FIG. 5, an application method of the optical coating for projection screen of this example, is introduced below and the preparation method includes the following steps:

S201: the optical coating for projection screen was applied onto a screen substrate by screen printing;

S202: the optical coating of projection screen was cured by blue light irradiation to the surface dry; and S203: a surface of the screen substrate without the optical coating for projection screen was laminated with the diffusion film to form a light-resistant screen product.

The above optical coating for projection screen adopts a combination of free radical polymerization and cationic polymerization, which can not only quickly cure the optical coating, but also ensure the deep curing of the film by dark reaction, thereby avoiding the problem of incomplete curing caused by the addition of the light-absorbing material.

The components in this example were mixed to prepare the optical coating for projection screen, which was used to produce an optical screen with Fresnel microstructures. The effects achieved were that the contrast was 9.0, the center gain was 1.0, the reflectivity (for light with a wavelength of 400 nm to 700 nm) was up to 21%, and the half-gain viewing angle was 45°.

Example 8

The specific composition and ratio of components of the optical coating for projection screen in this example are listed below:

| | |
|---|---|
| carbon black (average particle size, 35 nm) | 4 parts by weight |
| aluminum-silver powder (average particle size, 4 μm; flake diameter-thickness ratio, 1000 or less) | 12 parts by weight |
| polyurethane acrylate (acid value, 6 or less; hydroxyl value, 115 ± 3) | 25 parts by weight |
| glycidyl ether epoxy resin | 20 parts by weight |
| hexanediol diacrylate | 25 parts by weight |
| photoinitiator | 8 parts by weight |
| cellulose acetate butyrate | 3 parts by weight |
| stearic acid | 1 part by weight |
| defoamer | 1 part by weight |
| polymerization inhibitor | 1 part by weight. |

The optical coating for projection screen in this example can be prepared by the preparation method described in Example 7, which will not be repeated here.

The components in this example were mixed to prepare the optical coating for projection screen, which was used to produce an optical screen with Fresnel microstructures. The effects achieved were that the contrast was 10.0, the center gain was 0.9, the reflectivity (for light with a wavelength of 400 nm to 700 nm) was up to 19%, and the half-gain viewing angle was 46°.

Example 9

The specific composition and ratio of components of the optical coating for projection screen in this example are listed below:

| | |
|---|---|
| aqueous carbon black (average particle size, 35 nm) | 2 parts by weight |
| aqueous aluminum-silver powder (average particle size, 3 μm; flake diameter-thickness ratio, 1000 or less) | 15 parts by weight |
| aqueous polyurethane acrylate (acid value, 6 or | 25 parts by weight |

| | |
|---|---|
| less; hydroxyl value, 115 ± 3) | |
| aqueous glycidyl ether epoxy resin | 20 parts by weight |
| hexanediol diacrylate | 20 parts by weight |
| photoinitiator | 6 parts by weight |
| aqueous cellulose acetate butyrate | 4 parts by weight |
| DISPERBYK-192 | 1 part by weight |
| ethanol | 1 part by weight |
| polymerization inhibitor | 1 part by weight. |

The optical coating for projection screen in this example can be prepared by the preparation method described in Example 7, which will not be repeated here.

The components in this example were mixed to prepare the optical coating for projection screen, which was used to produce an optical screen with Fresnel microstructures. The effects achieved were that the contrast was 8.0, the center gain was 1.1, the reflectivity (for light with wavelength of 400 nm to 700 nm) was up to 19%, and the half-gain viewing angle was 44°.

In summary, the present disclosure provides an optical coating for projection screen, which simultaneously increase the gain and contrast of the projection screen. The film-forming substances in the optical coating for projection screen can be dissolved without volatile organic solvents, and cured using photocuring process during application and have no release of any volatile organic compounds. Compared with the traditional solvent-based optical coatings, it has advantages of environmental friendliness and being able to greatly reduce gas pollution. The aluminum-silver powder and light-absorbing material are added to the optical coating for projection screen, the screen attains directional high reflectivity via the directional alignment of the aluminum-silver powder, thereby achieving the effect of high gain, and the addition of the light-absorbing material improves the contrast of the screen, making the image color of the laser TV projection pictures more saturated and vivid.

What is claimed is:

1. An optical coating for a projection screen, comprising following components in parts by weight:

| | |
|---|---|
| a light-absorbing material | 2 to 15 parts by weight; |
| an aluminum-silver powder | 5 to 20 parts by weight; |
| an acrylate oligomer | 20 to 60 parts by weight; |
| a diluent | 10 to 45 parts by weight; |
| a photoinitiator | 0.5 to 15 parts by weight; |
| an auxiliary agent | 0.1 to 6 parts by weight; and |
| a dispersant | 0.2 to 5 parts by weight, | wherein the light-absorbing material is one or more of carbon black, lampblack, iron oxide black, or aniline black, and has an average particle size of 20 nm to 2000 nm, and wherein the aluminum-silver powder is flake-shaped and has an average particle size of 3 μm to 10 μm, and wherein the dispersant is one or more of polyol, stearic acid, or phosphate.

2. The optical coating for the projection screen according to claim 1, further comprising 20 to 25 parts by weight of an epoxy resin oligomer, and the epoxy resin oligomer is one or more of glycidyl ether epoxy resin, glycidyl ester epoxy resin, or glycidyl amine epoxy resin.

3. The optical coating for the projection screen according to claim 2, wherein the photoinitiator is camphorquinone, tertiary amine and iodonium salt, and a molar ratio of the camphorquinone, the tertiary amine and the iodonium salt is 2:1:1.

4. The optical coating for the projection screen according to claim 3, wherein the tertiary amine is triethylamine, ethyl N,N-dimethylaminobenzoate, or ethyl 4-dimethylaminobenzoate, and the iodonium salt is triaryl iodonium salt, diaryl iodonium salt, or alkyl iodonium salt.

5. The optical coating for the projection screen according to claim 1, wherein the acrylate oligomer has an acid value of 8 mgKOH/g or less, and a hydroxyl value of 65 mgKOH/g or more.

6. The optical coating for the projection screen according to claim 5, wherein the acrylate oligomer is one or more of polyurethane acrylate, polyester acrylate, polyether acrylate, or epoxy acrylate.

7. The optical coating for the projection screen according to claim 6, wherein the acrylate oligomer is an aqueous acrylate oligomer, and the diluent is deionized water.

8. The optical coating for the projection screen according to claim 7, further comprising 0.5 to 5 parts by weight of an anti-settling thixotropic agent, and the anti-settling thixotropic agent is one or more of organic bentonite, polyethylene wax, polyamide wax, or polyurethane thixotropic agent.

9. The optical coating for the projection screen according to claim 5, further comprising 20 to 25 parts by weight of an epoxy resin oligomer, and the epoxy resin oligomer is one or more of glycidyl ether epoxy resin, glycidyl ester epoxy resin, or glycidyl amine epoxy resin.

10. The optical coating for the projection screen according to claim 9, wherein the photoinitiator is camphorquinone, tertiary amine and iodonium salt, and a molar ratio of the camphorquinone, the tertiary amine and the iodonium salt is 2:1:1.

11. The optical coating for the projection screen according to claim 1, wherein the diluent is an acrylate diluent monomer configured to crosslink with the acrylate oligomer to form film-forming substances.

12. The optical coating for the projection screen according to claim 11, wherein the acrylate diluent monomer is one or more of methyl methacrylate, poly(ethylene glycol) diacrylate, poly(ethylene glycol) dimethacrylate, triethylene glycol diacrylate, lauryl acrylate, hexanediol diacrylate, trimethylolpropane triacrylate, trimethylolpropane trimethacrylate, or pentaerythritol triacrylate.

13. The optical coating for the projection screen according to claim 11, further comprising 20 to 25 parts by weight of an epoxy resin oligomer, and the epoxy resin oligomer is one or more of glycidyl ether epoxy resin, glycidyl ester epoxy resin, or glycidyl amine epoxy resin.

14. The optical coating for the projection screen according to claim 13, wherein the photoinitiator is camphorquinone, tertiary amine and iodonium salt, and a molar ratio of the camphorquinone, the tertiary amine and the iodonium salt is 2:1:1.

15. The optical coating for the projection screen according to claim 1, further comprising 0.1 to 5 parts by weight of a leveling agent, and the leveling agent is cellulose acetate butyrate.

16. The optical coating for the projection screen according to claim 15, further comprising 20 to 25 parts by weight of an epoxy resin oligomer, and the epoxy resin oligomer is one or more of glycidyl ether epoxy resin, glycidyl ester epoxy resin, or glycidyl amine epoxy resin.

17. The optical coating for the projection screen according to claim 16, wherein the photoinitiator is camphorquinone, tertiary amine and iodonium salt, and a molar ratio of the camphorquinone, the tertiary amine and the iodonium salt is 2:1:1.

18. The optical coating for the projection screen according to claim 1, wherein the auxiliary agent is one or more of a defoamer, a polymerization inhibitor, a wetting agent, or an antioxidant; the defoamer is one or more of ethanol, n-butanol, organosilicone ester, or mineral oil, and wherein the defoamer accounts for 0.1 to 3 parts by weight;

the polymerization inhibitor is hydroxyanisole and/or hydroquinone, and the polymerization inhibitor accounts for 0.2 to 3 parts by weight; and the wetting agent is one or more of lecithin, polyamino salt, or polyvalent carboxylate.

19. The optical coating for the projection screen according to claim 1, wherein the photoinitiator is one or more of diphenylphosphine oxide, 1-hydroxycyclohexyl phenyl ketone, or camphorquinone.

* * * * *